US008140827B2

(12) United States Patent
Liang et al.

(10) Patent No.: US 8,140,827 B2
(45) Date of Patent: Mar. 20, 2012

(54) SYSTEM AND METHOD FOR EFFICIENT DATA TRANSMISSION IN A MULTI-PROCESSOR ENVIRONMENT

(75) Inventors: Victor K. Liang, Irvine, CA (US); Shiang-Feng Lee, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 786 days.

(21) Appl. No.: 11/765,372

(22) Filed: Jun. 19, 2007

(65) Prior Publication Data

US 2008/0320278 A1 Dec. 25, 2008

(51) Int. Cl.
*G06F 15/76* (2006.01)
(52) U.S. Cl. ............................................. 712/11; 712/29
(58) Field of Classification Search .................... 712/11, 712/29
See application file for complete search history.

(56) References Cited

U.S. PATENT DOCUMENTS

| | | | | |
|---|---|---|---|---|
| 5,206,903 A * | 4/1993 | Kohler et al. | ............ | 379/265.12 |
| 5,313,454 A * | 5/1994 | Bustini et al. | ................ | 370/231 |
| 5,704,047 A * | 12/1997 | Schneeberger | ............... | 709/235 |
| 5,748,614 A * | 5/1998 | Wallmeier | ............... | 370/395.41 |
| 5,768,258 A * | 6/1998 | Van As et al. | ................ | 370/236 |
| 6,018,347 A * | 1/2000 | Willis | ............ | 345/419 |
| 6,208,997 B1 * | 3/2001 | Sigeti et al. | ................ | 707/104.1 |
| 6,246,691 B1 * | 6/2001 | Briem et al. | ................ | 370/412 |
| 6,401,147 B1 * | 6/2002 | Sang et al. | ..................... | 710/56 |
| 6,459,681 B1 * | 10/2002 | Oliva | ............ | 370/232 |
| 6,680,949 B1 * | 1/2004 | Briem | ........... | 370/418 |
| 6,917,590 B1 * | 7/2005 | Oliva | ............ | 370/232 |
| 2005/0055696 A1 * | 3/2005 | Betzler et al. | ................ | 718/100 |
| 2007/0121499 A1 * | 5/2007 | Pal et al. | ...................... | 370/230 |
| 2008/0052441 A1 * | 2/2008 | Freking et al. | ................ | 710/310 |
| 2008/0123671 A1 * | 5/2008 | Spencer | ...................... | 370/412 |

OTHER PUBLICATIONS

Kwon et al., "Scheduling algorithm for real-time burst traffic using dynamic weighted round robin", Proceedings of International Symposium on Circuits and Systems (ISCAS), pp. 506-509, May 1998.
Liang, Yao, "A Simple and Effective Scheduling Mechanism Using Minimized Cycle Round Robin", IEEE International Conference on Communications (ICC), vol. 4, pp. 2384-2388, 2002.
Wang et al., "Adaptive-Weighted Packet Scheduling for Premium Service", Proceedings of IEEE International Conference on Communications (ICC), vol. 6, pp. 1846-1850, 2001.

* cited by examiner

*Primary Examiner* — Idriss N Alrobaye
(74) *Attorney, Agent, or Firm* — Beyer Law Group LLP (57) ABSTRACT

A system and method which provides for efficient data transmission between multiple microprocessors in a computer system is disclosed. A physical data path is divided into one or more data queues which may be virtual connection queues. The virtual connection queues are configured to adaptively split or merge based on traffic conditions therein.

19 Claims, 7 Drawing Sheets

SYSTEM AND METHOD FOR EFFICIENT DATA TRANSMISSION IN A MULTI-PROCESSOR ENVIRONMENT

BACKGROUND OF THE INVENTION

1. Field of the Invention

This application relates to enhancing data transmission. More particularly, this application relates to systems and methods which enhance data transmission rates by utilizing adaptive, weighted, hierarchical scheduling techniques.

2. Description of the Related Technology

Many computer systems include multiple data processors or processes which need to share information. For example, a system may include a large central processing unit which shares information with a less powerful secondary processor in the system that is used to perform certain specified tasks within the system. Data transmitted between the two processors typically is sent in a data queue. Typically, the bandwidth and processor time available to the data queue is limited, which means that when large amounts of data need to be transmitted between the processors, the data transmission may be delayed because the amount of data to be transmitted exceeds the available bandwidth. This delay is called data latency.

In many cases, some of the data to be transmitted between the processor has great significance and urgency, while other data is not as important. As a result, it is desirable to reduce the latency of important data, even if it means increasing the delay in transmitting the less important data. Various techniques for ensuring the prompt transmission of urgent and high priority data have been proposed. These techniques include utilizing weighted round robin scheduling algorithms to adjust scheduling weights based on current traffic conditions in the data queue. However these techniques generally suffer from various shortcomings including the inability to provide proportional adjustment of queue size based on levels of traffic and the inability to reallocate bandwidth to significant service queues. Accordingly, it would be an advancement in the art to provide a scheduling and data queuing solution which addresses these and other shortcomings.

SUMMARY OF CERTAIN INVENTIVE ASPECTS

The system, method, and devices of the present invention each have several aspects, no single one of which is solely responsible for its desirable attributes. Without limiting the scope of this invention, several of its features will now be discussed briefly.

In one aspect, a computer-implemented method of providing inter-processor communication on a data between a first processor and a second processor is provided. The method includes creating at least a first virtual connection having a first data capacity and a second virtual connection having a second data capacity between the first processor and the second processor. The first virtual connection is configured to transmit data having a first priority. The second virtual connection is configured to transmit data having a second priority. A latency threshold is defined for each of the first virtual connection and the second virtual connection. The method further includes creating a third virtual connection having a third data capacity which is configured to transmit data having the first priority wherein the transmission time of the data transmitted on the first virtual connection exceeds the latency threshold of the first virtual connection.

In another aspect, a system for sharing data in a multi-processor environment is provided. The system includes a first processor and a second processor. The system further includes a data path between the first processor and the second processor which has a fixed bandwidth comprising one or more virtual connection queues. The virtual connection queues are configured to adaptively split and merge based on latency measurements of data sent along the electrical path.

BRIEF DESCRIPTION OF THE DRAWINGS

In this description, reference is made to the drawings wherein like parts are designated with like numerals throughout.

DETAILED DESCRIPTION OF CERTAIN INVENTIVE EMBODIMENTS

Various embodiments disclosed herein provide a system and method which provides for efficient data transmission between multiple microprocessors in a computer system. As used herein, a computer system refers to any type of device which uses microprocessors to process data. Computer systems may include personal computers, notebook computers, cable set top boxes, digital video recorders, mobile telephones, televisions, printing devices, multimedia players, or some other multi-processor device.

Figure 1:
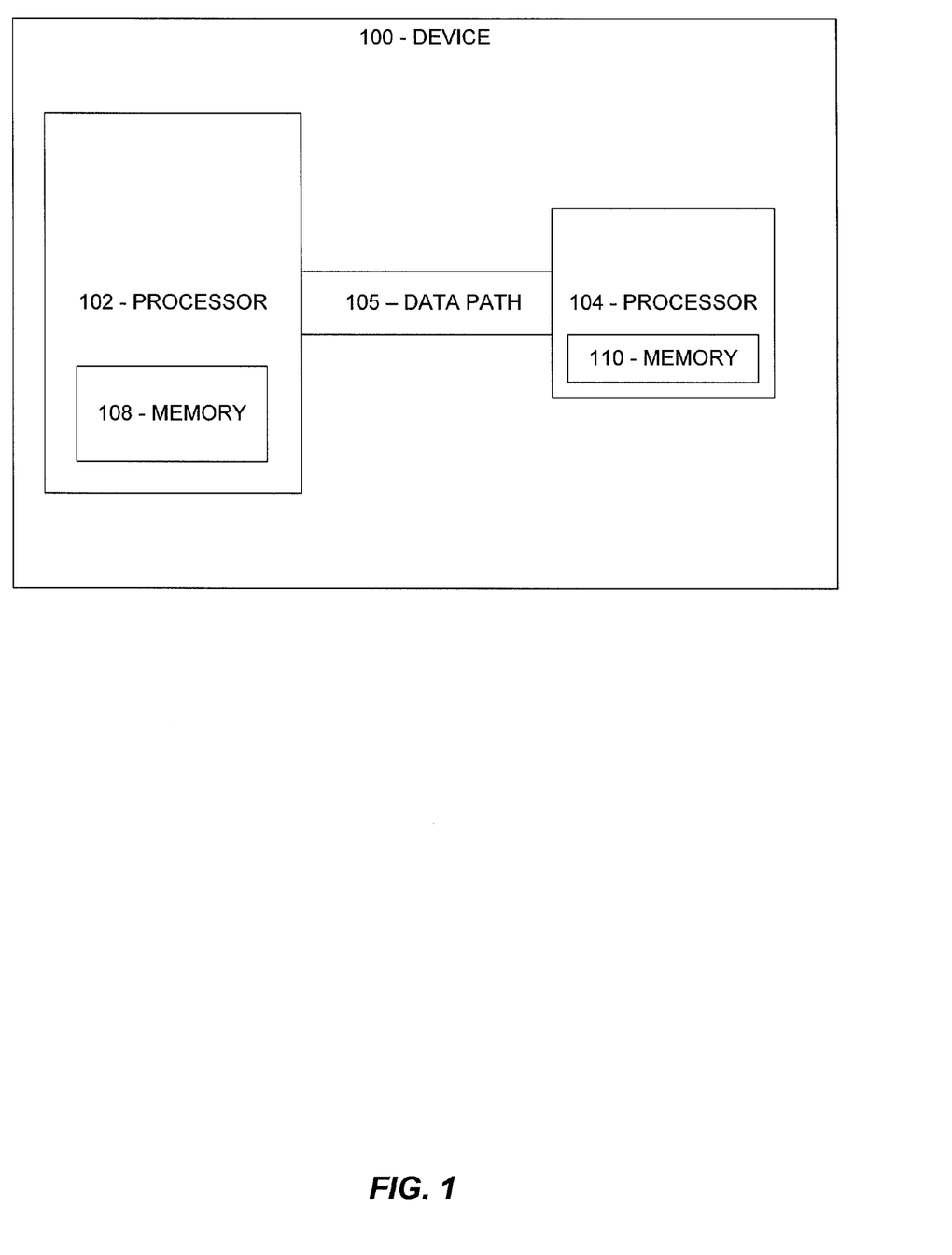
FIG. 1 is an example of a device suitable for the implementation of various embodiments.

FIG. 1 is an example of a device 100 suitable for the implementation of various embodiments that will be more fully described below. The device 100, which may be a computer system, includes a first processor 102. The first processor 102 may be a system processor such as a central processing unit which is used to help control the operation of the device by processing computer instructions and other data. The first processor 102 may include a memory 108. In some embodiments, the memory 108 may be an on board memory cache, or it may be some other type of memory which is able to store data to be processed by the processor.

The device 100 further includes a second processor 104. The second processor 104 may take various forms. In one embodiment, the second processor is a specialized processor which performs more limited duties than a central processing unit. The second processor 104 may be associated with a more peripheral function such as processing multimedia data, such as with a video card, a graphics card, or the like. The second processor 104 may also take the form of a smartcard or some other secondary processor in a set top box. In some embodiments, the second processor 104 may further include an onboard memory 110 which stores or caches data in such a way as to allow the processor faster access to that data.

Between the first processor 102 and the second processor 104 is a data path 105. The data path 105 is a physical connection which allows data to be transmitted from the first processor 102 to the second processor 104. The data path 105 may be in the form of dedicated wire(s) having a fixed bandwidth. Alternatively, the data path 105 may be an allocated or dedicated portion of a wider data channel which permits two way transmission of data between the first processor 102 and the second processor 104. The data path may take other forms.

According to various embodiments, the data path 105 may be dynamically divided into one or more data queues which are prioritized with different scheduling weights by scheduler, such as a round robin scheduler, for example. The scheduling weight relates to the amount of processor time allocated to the queue by a may be used to efficiently transmit data based on the priority of the data and the scheduling weight of the queue. In some embodiments, the second processor 104 has limited processing power and a low bandwidth of interface as compared to the first processor 102. As a result, data sent from the first processor 102 to the second processor may exceed the interface bandwidth of the second processor 104 with the first processor 102. When this occurs, portions of the incoming data may be queued or delayed until the second processor 104 has available capacity to handle those portions of the incoming data.

Figure 2:
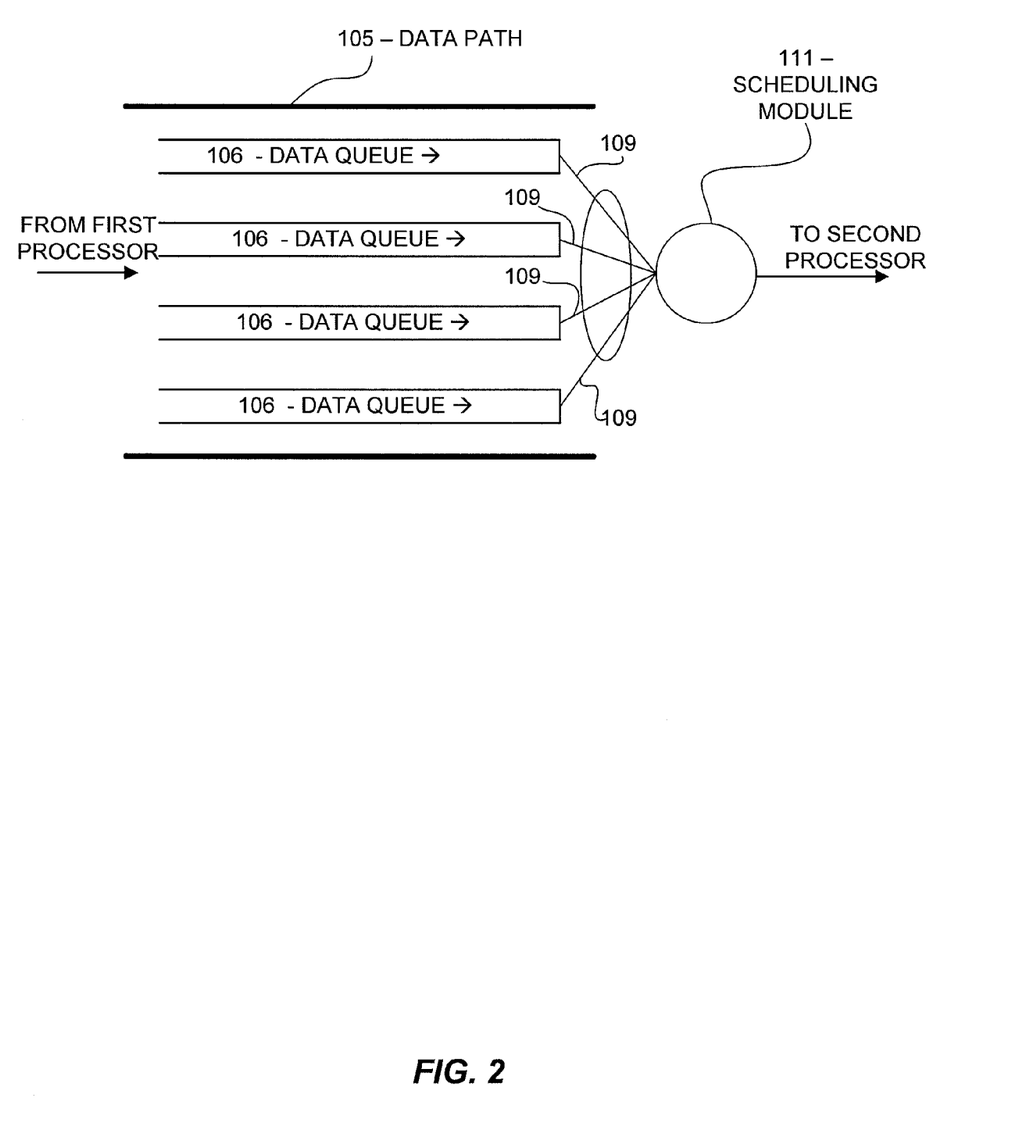
FIG. 2 is a diagram illustrating the configuration of the data path from FIG. 1.

Referring now to FIG. 2, a diagram showing a more detailed example of a data path 105 is provided. As shown in the figure, the data path 105 may be divided into one or more data queues 106. The data queues 106 may comprise virtual connections through which data is transmitted from the first processor 102 to the second processor 104. As used herein, a virtual connection refers to any data connection between two entities. The data queues 106 may be data structures which manage the transmission of data through the data path 105.

The data queues 106 are typically in communication with a scheduling module 111 which is used to allocate resources of the second processor 104 among the respective data queues 106. The scheduling module 111 may take the form of software stored on one of the processors 102 or 104 in memory 108 or 110. Alternatively, the scheduling module 111 may be hardware based and implemented an application specific integrated circuit (ASIC). As noted above, the scheduling module 111 may be a round robin scheduler. Alternatively, it may take the form of a fair-queuing scheduler, a proportionally fair scheduler, a maximum throughput scheduler, or some other scheduler known in the art.

In some embodiments, the data queues are implemented as a linked list data structure. Alternatively, the data queues may be some other form of data structure, such as an array for example. As will be discussed in further detail below, a data queue 106 may be split into several data queues so as to increase throughput when necessary or desirable. Conversely, multiple data queues 106 may be merged into a single data queue if there is limited data transmission occurring within the queues. In order to determine whether to split or merge a one or more data queues 106, a one or more latency thresholds may be defined which indicate levels of transmission delays for the data queues 106. One or more latency thresholds may be defined for a data queue 106, and the thresholds may be based on a variety of factors such as an acceptable latency for the data queue 106, a priority for the data sent through the queue 106, the size of the queue, or some other factor.

Figure 3:
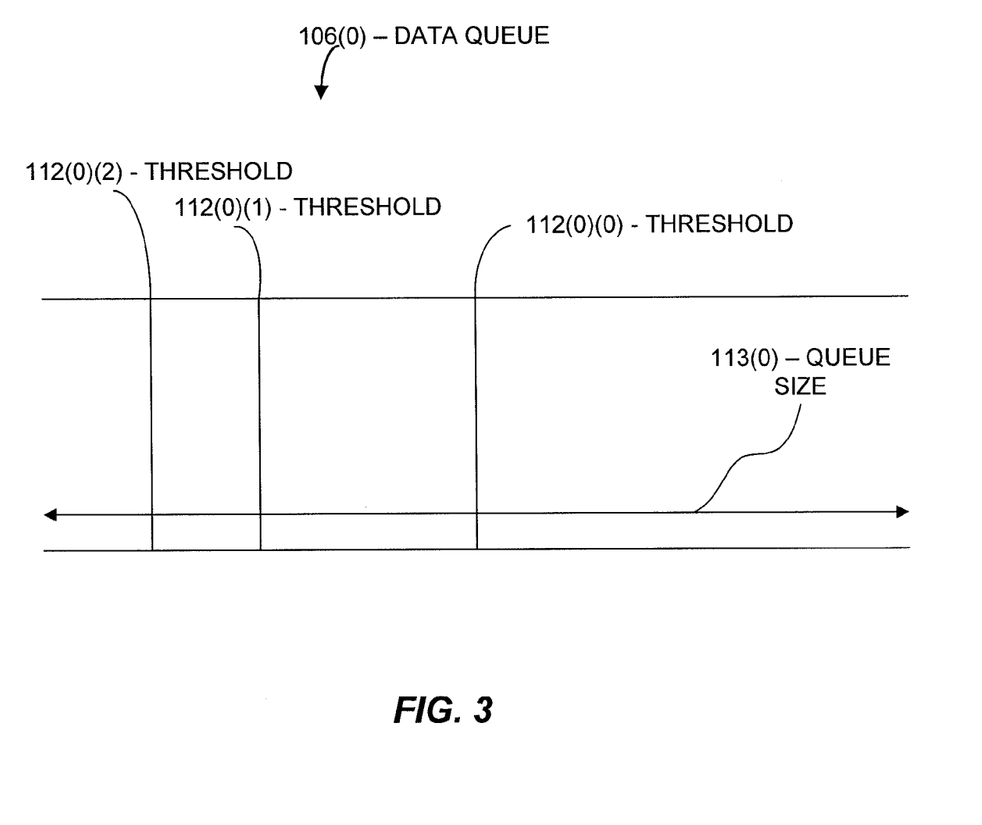
FIG. 3 is a block diagram of a data queue and its associated thresholds.

Referring now to FIG. 3, an example of a data queue 106 is provided. As there may be multiple data queues 106 having multiple thresholds 112 in a given device 100, for ease of reference, different data queues 106 (and their associated subcomponents) will be called out herein with a sub-identifier such as data queue 106(n), where n is an integer. As shown in FIG. 3, a data queue 106(0) includes a queue size 113(0). The queue size 113(0) is a measurement of the portion of data path 105 bandwidth made available to this particular data queue 106(0). In some embodiments, the queue sizes for each of the data queues 106 are the same. In other embodiments, the queue size may be variable between different data queues 106. For example, a first data queue 106(0) may have a queue size 113(0) of 578 bytes. A second data queue 106(1) may have a different queue size 113(1) such as 978 bytes, for example. As noted above, data queues 106 may also include one or more thresholds 112. As is discussed in detail below in connection with FIGS. 5 and 6, the thresholds 112 are used to determine when and if to split a data queue 106 into one or more additional data queues, and they are further used to determine when and if to merge two or more data queues 106 into a single data queue 106. In the example provided in FIG. 3, the data queue 106(0) has three defined thresholds 112(0)(0), 112(0)(1), 112(0)(2). Each threshold conceptually represents the amount of delay incurred by data sent to the queue. The delay may be a time measurement, e.g. latency, or it may be a measurement of data. In either case, a threshold 112 is exceeded when the "traffic jam" or level or transmission delay in the data queue 106 extends past the threshold.

In certain embodiments, an initial threshold (such as threshold 112(0)(0) shown in FIG. 3) may be used to compute additional thresholds associated with a data queue (such as data queue 106(0)). Each additional threshold, such as threshold 112(0)(1) and threshold 112(0)(2) for example, may have a linear or non-linear relationship with the initial threshold 112(0)(0). In implementation of a relationship between thresholds, an alpha (α) value may be defined. In some instances, an exponential formula may be used. In these instances the αvalue may be set to a value of ½. Thus if the initial threshold 112(0)(0) in data queue 106(0) is set to 512 bytes, the next threshold 112(0)(1) may be defined as 512 bytes+½·X·bytes. Additional thresholds may be defined similarly according to the equation:

$$\text{Threshold}(n) = \sum_{i=0}^{n-1} \alpha^i \cdot \text{Threshold}(0)$$

Figure 4A:
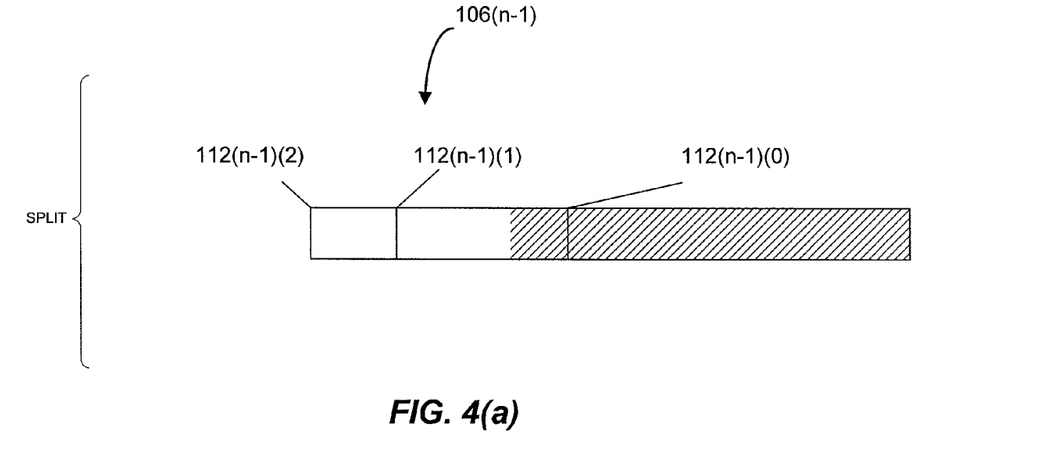
FIGS. 4(a) and 4(b) are examples of splitting data queues.
Figure 4B:
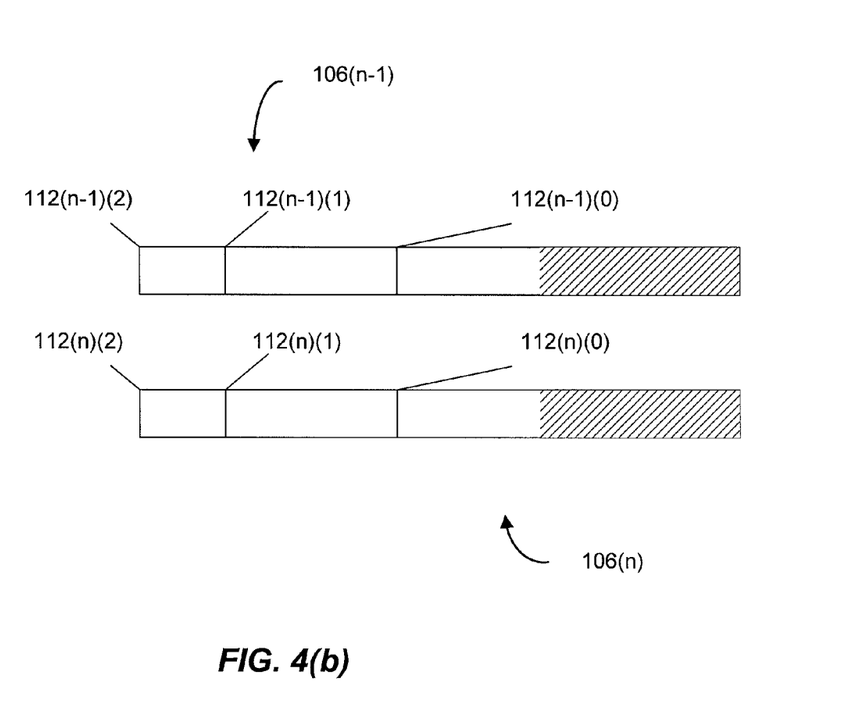

FIGS. 4(a) and 4(b) provide an illustration of a situation in which data sent to a first data queue exceeds a latency threshold defined in the data queue. As shown in the FIG. 4(a), a data queue 106(n−1) includes three defined thresholds 112(n−1)(0), 112(n−1)(1), and 112(n−1)(2). In the example provided, the data (indicated by the shaded area of the figure), exceeds the first threshold 112(n−1)(0) defined in the data queue 106(n−1). Because the data exceeds the threshold 112(n−1)(0) in data queue 106(n−1), the data queue 106(n−1) is split into two data queues 106(n−1) and 106(n) as shown in FIG. 4(b).

In some embodiments, the two data queues 106(n−1) and 106(n) resulting from the split are clones. In particular, the defined threshold in each of the data queues 106(n−1) and 106(n) are set as the same levels. Thus, in the example shown in FIG. 4(b), the two data queues 106(n) and 106(n−1) have the same threshold levels 112. When the initial data queue 106(n−1) is split due to the latency threshold being exceeded, the data may be equally distributed among the existing data queue 106(n−1) as shown in FIG. 4(b). Once the data has been equally distributed among the two data queues, it no longer exceeds the defined thresholds 112 and no further action is needed. Although this particular example shows the data being distributed evenly among the data queues, a skilled artisan will appreciated that the data may also be distributed unevenly among the two data queues 106. Additionally, data queues 106 may be configured to accommodate data bursts which easily exceed the initial threshold 112. For example, in some instances, a burst of data my not only exceed the initial threshold 112(n)(0), but it may also exceed the next defined threshold 112(n)(1). When a data burst exceeds two thresholds, the data queues may be configured to split twice, resulting in a total of four data queues 106 to accommodate the traffic. Similarly, if the data burst surpasses the third defined threshold, the data queue may split three times into a total of eight data queues 106 in order to handle the traffic.

Figure 5A:
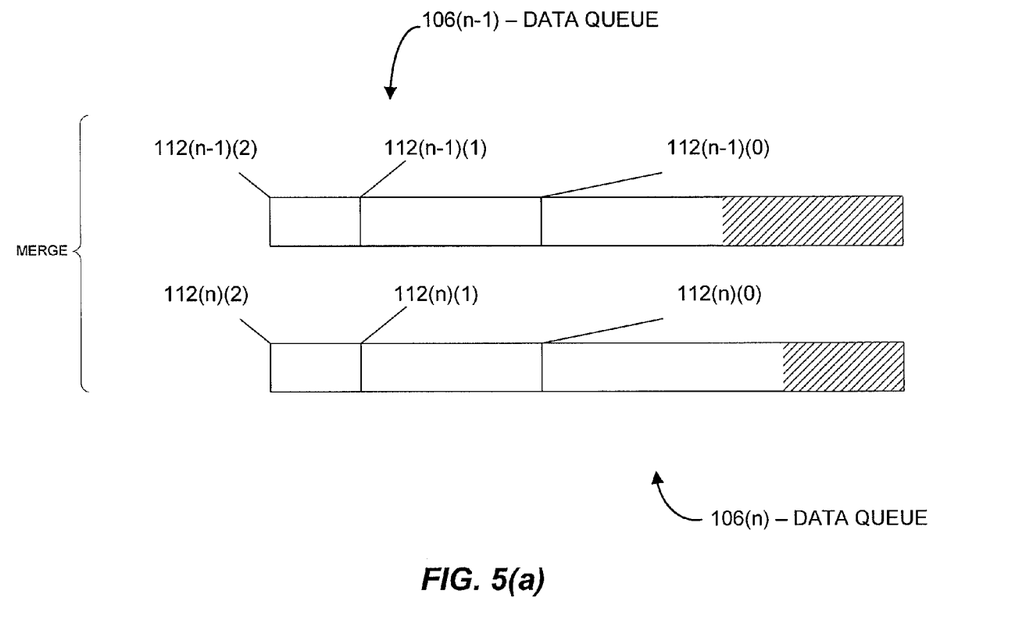
FIGS. 5(a) and 5(b) are examples of merging data queues.
Figure 5B:
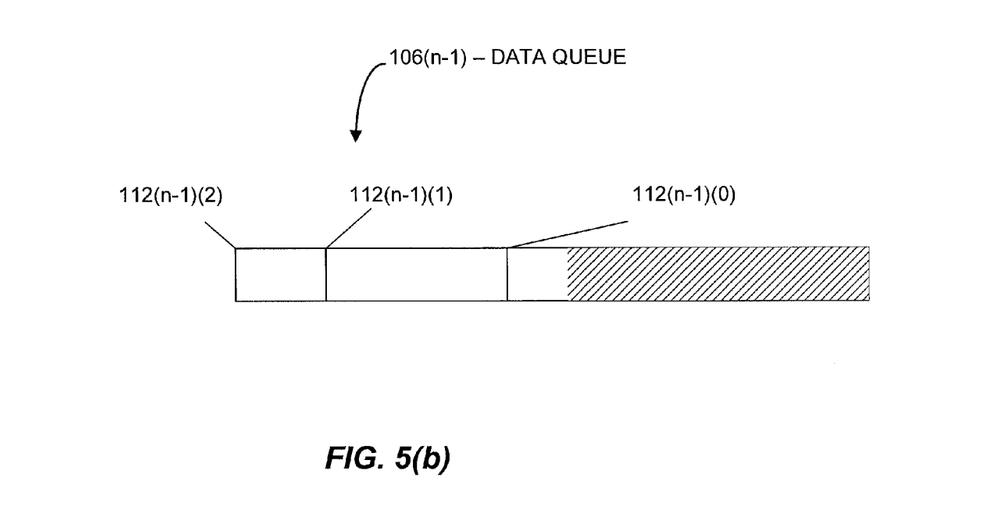

Certain aspects of the invention also provide for merging data queues when their utilization levels fall below a threshold or value. FIGS. 5(*a*) and 5(*b*) provide an illustration of these aspects. FIG. 5(*a*) shows two data queues 106(n−1) and 106(n) having thresholds 112(n−1)(0), 112(n−1)(1), 112(n−1)(2) and 112(n)(0), 112(n)(1), 112(n)(2), respectively. As illustrated in FIG. 5(*a*), the amount of queued data (shown by shared area) in both data queues 106(n−1) and 106(n) is substantially below the defined thresholds. As a result, the two data queues 106(n−1) and 106(n) are merged into a single data queue 106(n−1). Although the merged queue receives all of the data from the unmerged queues, the data is still less than the initial threshold 112(n−1)(0) in the merged queue. In some embodiments, any two data queues 106 each having queued data which is less than ½ the initial defined threshold 112 are merged into a single data queue.

In some embodiments, the data queues 106 described above may be implemented as part of a larger queuing scheme which provided more efficient transfer of data between the first processor 102 and the second processor 104. The queuing scheme may be based on a hierarchical weighted tree structure. In these embodiments, the data queues 106 form the tree structure and are dynamically merged and expanded with tree nodes and branches being based on actual traffic conditions between the first processor 102 and the second processor 104.

As discussed previously, each data queue 106 may have an associated scheduling weight 109 which is managed by the scheduling module 111. The scheduling weight 109 for a given data queue 106 may be a percentage of the interface bandwidth of the second processor 104 allocated to that data queue. Thus, the sum of all scheduling weights 109 for the data queues 106 in a data path 105 between a first processor 102 and the second processor 104 is equal to 1—mathematically expressed as:

Weight(Data Queue 0)+Weight(Data Queue 1)+ . . . +Weight(Data Queue *n*)=1, where n is the number of data queues 106 in the data path 105.

In order to implement the queuing scheme and adjust merge and split data queues 106 accordingly, a measurement of the latencies for data queues is required. These measurements may be computed utilizing various techniques. In one embodiment, the latency of a data queue 106 is determined by summing the length of packets that are in the queue. In other words, the latency is determined by the length of the queue. This calculation may occur each time a new packet is sent to the queue. Alternatively, an exponential moving average (EMA) may be utilized to determine data queue length and thus the latency. The EMA for data queue 106 may be calculated according to the equation $$\overline{q}(t) = \frac{q(t) + (1-\beta)q(t-1) + (1-\beta)^2 q(t-2) + (1-\beta)^3 q(t-3) + \ldots}{1 + (1-\beta) + (1-\beta)^2 + (1-\beta)^3 + \ldots}$$

$$= \beta \cdot q(t) + (1-\beta) \cdot \overline{q}(t-1)$$

EMA, sometimes also called an exponentially weighted moving average (EWMA), applies weighting factors which decrease exponentially as shown in the above equation. EMA gives a more accurate estimate of the latency, by giving more importance to recent observations while not discarding older observations entirely. In the above equation, each entry q(t) represents the observed data queue length at a specific time t. $\overline{q}(t)$ present the EMA of the queue length at time t. The degree of weighing decrease is expressed as a constant smoothing factor $\beta$, a number between 0 and 1. The larger value of $\beta$ makes the measurement of data queue length adapt more rapidly to the instantaneously data input.

Figure 6A:
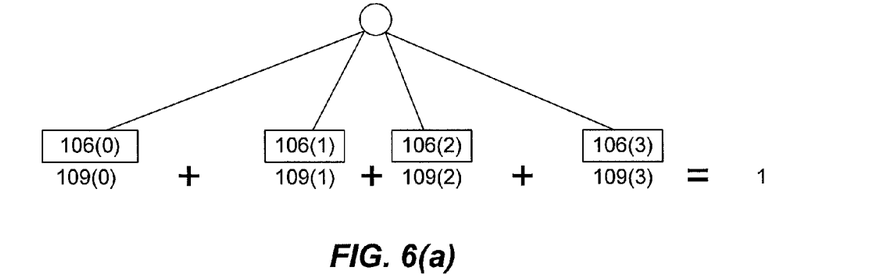
FIGS. 6(a), 6(b), and 6(c) are examples of tree structures which manage the merging and splitting of data queues.
Figure 6B:
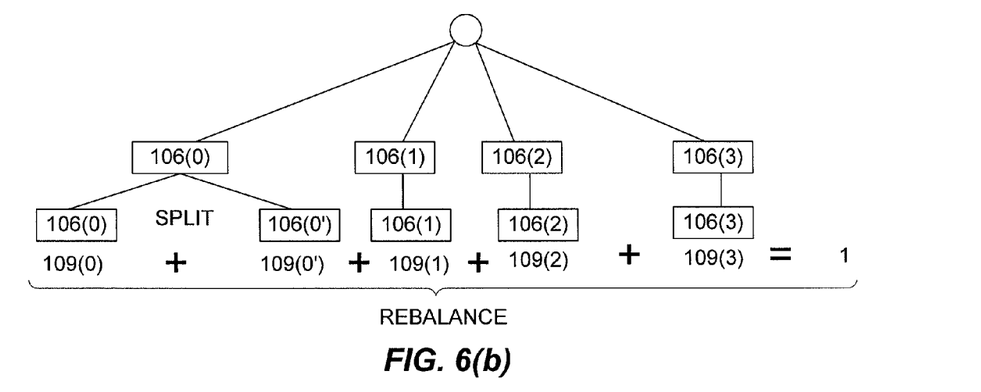
Figure 6C:
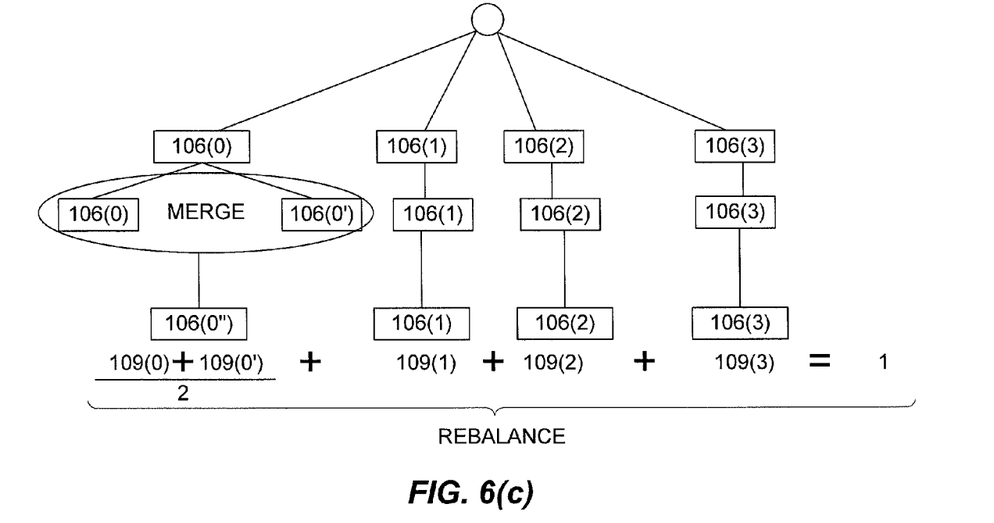

FIGS. 6(*a*)-6(*c*) provide examples of a tree-based structure for data queues 106 and further illustrate how additional data queues 106 are created as tree nodes when thresholds 112 associated with the data queues 106 are exceeded. Referring now to FIG. 6(*a*), an initial tree having four data queues 106(0)-106(3) is provided. Each of the data queues 106(0)-106(3) has an associated scheduling weight 109(0)-109(3). The scheduling weights 109(0)-109(3) together add up to 1 as shown in the figure.

In some embodiments, each of the initial data queues 106 may be configured to carry different types of data or data having different priorities. For example, in the tree illustrated in FIG. 6(*a*), the data queue 106(0) may carry the highest priority data between the first processor 102 and the second processor 104, whereas the remaining data queues 106(1)-106(3) may carry less urgent data. The urgent data sent over the first data queue 106(0) may take the form of key data which may be used to descramble video sent from a first processor 102 to the second processor 104. The less urgent data sent over the remaining data queues may include firmware downloads or housekeeping data. In order to ensure that the urgent data has sufficient quality of service, the scheduling weight 109(0) for data queue 106(0) may be proportionally higher than the scheduling weights 109(1)-109(3) for the other data queues in the tree.

FIG. 6B provides an example of how a data queue 106 may split due to data exceeding a defined threshold 112. In the example provided, the queued data in queue 106(0) from the data tree FIG. 6(*a*) exceeds a defined threshold 112(0) associated with the data queue. The data queue 106(0) is split into two new data queues. The other data queues 106(1)-106(3) do not split because their thresholds have not been exceeded. In some embodiments, the new data queue 106(0') created from the split of data queue 106(0) is identical to the parent data queue 106(0). Thus, the new data queue has the same thresholds 112 and initially the same scheduling weights 109 as the data queue from which it is derived. Because the creation of the new data queue adds an additional scheduling weight 109 to the tree structure, the scheduling weights 109(0)-109(4) for each data queue 106(0)-106(4) may be rebalanced (e.g. normalized) so that they still add up to 1.

FIG. 6C shows how two data queues can be merged when the amount of data falls below a defined level (such as ½ the initial threshold 112 as described above). In the example provided, the queued data in each of data queues 106(0) and 106(0') from tree structure FIG. 6B is below ½ their thresholds 112(0) and 112(0'). As a result, the data queues 106(0) and 106(0') are merged into a single data queue 106(0"). When the data queues are merged, the new data queue 106(0") may be given threshold values based on the average threshold values of the parent data queues. In one embodiment, the new thresholds 112 may be calculated according to the equation $$T_j = \frac{\sum_{i}^{M-1} T_{i,j}}{M}$$

where Tj is the jth threshold of a data queue. In the above example, Tj is the threshold 112(0)(j) of the data queue 106 (0). M is the number of nodes to be merged. In the above example, M is equal to 2, i is the sub-identifier of a data queue. In the above example, i is the identifier 0 and 0' for 106(0) and 106(0'), respectively, and j is the identifier (level) of threshold for a data queue. In addition, the scheduling weight 109(0") for the merged data queue 106(0") may be determined by taking the average of the scheduling weights 109(0) and 109 (0'). When this occurs, the combined sum of the scheduling weights 109(0)-109(3) will be less than 1. As a result, the scheduling weights may be rebalanced (e.g. normalized) so that their sum is equal to 1.

Figure 7:
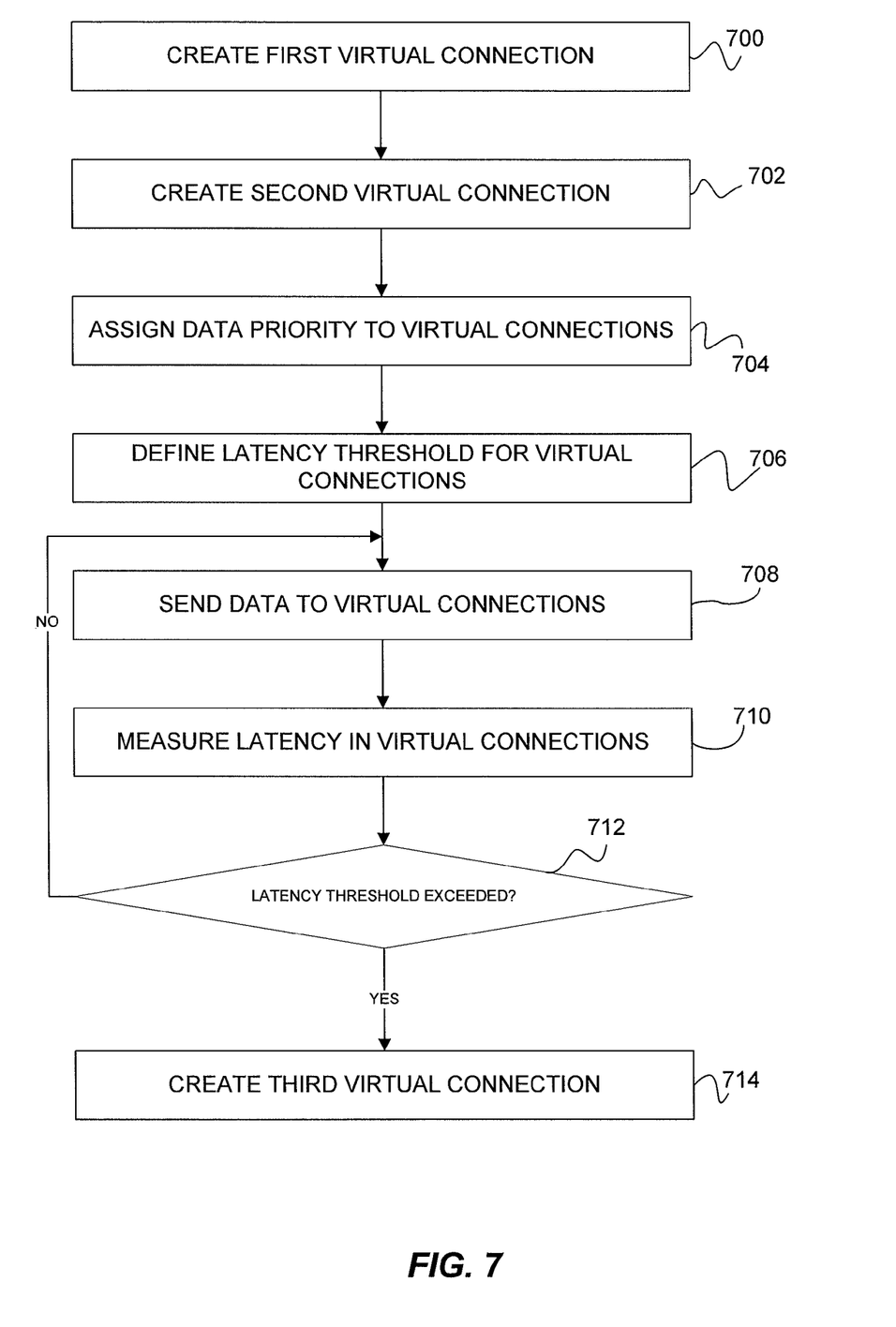
FIG. 7 is a flowchart showing a method of providing inter-processor communication on a channel between a first processor and a second processor.

As discussed previously, one or more embodiments provide for a process by which inter-processor communication is provided on data path between a first processor and a second processor. FIG. 7 is a flowchart of describing one exemplary embodiment. The process begins at block 700, where a first virtual connection is created between the first processor and the second processor. The first virtual connection may have an assigned data capacity which may take the form of a queue size 113. Next at block 702, a second virtual connection is created between the first processor and the second processor and also may be assigned a data capacity such as queue size 113. The virtual connections may be data queues 106.

Next, at block 704, each of the first and second virtual connections are assigned a data priority. As noted above, the virtual connection may receive data from the first processor based on type of data being transmitted. Important and urgent data may be sent through the first virtual connection, while less important data may be sent through the second virtual connection. Next, at block 706, a latency threshold 112 is defined for each of the first and second virtual connections. Next at block 708, data is sent over the first and second virtual connections. As the data is sent, the latency is determined for each of the virtual connections at block 710. Next, the process moves to decision block 712, where it is determined if the latency in the virtual connections exceeds the latency threshold 112 for the connection. If not, the process returns to block 710. If the latency threshold is exceeded, the process moves to block 714, where the virtual connection which has exceeded the latency threshold is split, thereby creating a third virtual connection having a third data capacity.

It will be understood by those of skill in the art that numerous and various modifications can be made without departing from the spirit of the present invention. Therefore, it should be clearly understood that the forms of the invention are illustrative only and are not intended to limit the scope of the invention.

What is claimed is:

1. A computer-implemented method of providing inter-processor communication on data path between a first processor and a second processor, the method comprising:
    creating a first virtual connection having a first data capacity between the first processor and the second processor, the first virtual connection configured to transmit data having a first priority and having a first scheduling weight and having a first latency threshold, a second latency threshold, and a third latency threshold;
    creating a second virtual connection having a second data capacity between the first and the second processor and having a second scheduling weight, the second virtual connection configured to transmit data having a second priority; and
    creating a third virtual connection having a third data capacity configured to transmit data having a third priority and having a third scheduling weight, wherein the transmission time of the data transmitted on the first virtual connection exceeds the latency threshold of the first virtual connection;
    wherein the first virtual connection is split into the second virtual connection and the third virtual connection when the first latency threshold is exceeded;
    wherein the second processor has a data destination component, and wherein the first virtual connection is configured to transmit data to the data destination component, and wherein the second and third virtual connections are also configured to transmit data to the data destination component.

2. The computer-implemented method of claim 1, further comprising distributing the data having the first priority among the first virtual connection and the third virtual connection.

3. The computer-implement of claim 1 further comprising:
    sending data having the first priority from the first processor to the second processor through the first virtual connection; and
    determining that the sent data exceeds the latency threshold of the first virtual connection.

4. The computer-implemented method of claim 1, further comprising normalizing the data capacities for the first, second, and third virtual connections.

5. The computer-implemented method of claim 1, wherein the data capacity of the third virtual connection is substantially similar to the data capacity of the first virtual connection.

6. The computer-implemented method of claim 5, wherein normalizing the latency thresholds comprises proportionally allocating data capacity among the first, second, and third virtual connections.

7. The computer-implemented method of claim 6, wherein proportionally allocating data capacity comprises reducing the data capacity of at least one of the first and second virtual connections based on the data capacity of the third virtual connection.

8. The computer-implemented method of claim 1, wherein a second latency threshold is defined for the first virtual connection, the second latency threshold being greater than the first latency threshold for the first virtual connection, and further comprising creating at least a fourth virtual connection having a fourth data capacity configured to transmit data having the first priority.

9. The computer-implemented method of claim 8, further comprising determining that the sent data exceeds the second latency threshold of the first virtual connection.

10. The computer-implemented method of claim 1, wherein the first processor is a primary processing have a first processing capability and the second processor is a secondary processor having a second processing capability.

11. The computer-implemented method of claim 10, wherein the second processor has less processing power than the first processor.

12. The computer-implemented method of claim 1, wherein the first processor is a central processing unit of a set-top box.

13. The computer-implemented method of claim 12, wherein the second processor is a central processing unit of a set-top box.

14. A system for sharing data in a multi-processor environment comprising:
  a first processor;
  a second processor;
  a data path between the first processor and the second processor, the data path having a fixed bandwidth comprising a first-virtual connection having a first assigned scheduled weight defined therein, the first virtual connection configured to adaptively split and merge based on latency measurements of data sent along the data path, wherein the system is configured to have a first, a second, and a third latency threshold for virtual connection queues and wherein two or more virtual connections, each having a respective assigned scheduling weight based on data priorities, are generated when a burst of data exceeds one or more of the first, the second or the third latency thresholds and wherein the first virtual connection is split into two virtual connections when the first latency threshold is exceeded and wherein the first virtual connection is split into four virtual connections when the second latency threshold is exceeded.

15. The system of claim 14, wherein the scheduling weight of each of the one or more additional virtual connection queues are rebalanced proportionately.

16. The system of claim 14, wherein the one or more virtual connection queues are configured to merge if the latency measurements are less than a specified level of the threshold of latency.

17. The system of claim 16, wherein the specified level is ½.

18. A computer-implemented method of transmitting data from a processor having a data path configured to transmit data from the processor, the method comprising:
  creating within the data path a first virtual connection having a first data capacity, the first virtual connection configured to transmit data having a first priority;
  assigning a scheduling weight to the first virtual connection;
  defining a first, second, and third latency threshold for the first virtual connection;
  receiving a burst of data in the first virtual connection which exceeds one or more of the first, second, and third latency thresholds;
  generating, in response to the burst of data and based on the number of latency thresholds exceeded by the burst of data in the first virtual connections, two or more virtual connections by splitting the first virtual connection when the first latency threshold is exceeded, and wherein the first virtual connection is split into four virtual connections when the second latency threshold is exceeded;
  assigning scheduled weights to each of the generated two or more virtual connections, wherein the assigned scheduled weights are based on the priority of the data in each of the two or more generated virtual connections; and
  distributing the data burst from the first virtual connection into the generated two or more virtual connections.

19. The computer-implemented method of claim 18, wherein the first virtual connection is split into eight virtual connections when the third latency threshold is exceeded.

* * * * *